United States Patent [19]

Phinney

[11] 4,114,745

[45] Sep. 19, 1978

[54] MARINE PROPULSION CONTROL TRANSFER SYSTEM

[75] Inventor: John M. Phinney, Milwaukee, Wis.

[73] Assignee: The Falk Corporation, Milwaukee, Wis.

[21] Appl. No.: 779,024

[22] Filed: Mar. 18, 1977

[51] Int. Cl.[2] .............................................. B60K 41/00

[52] U.S. Cl. ................................ 192/0.098; 74/480 B

[58] Field of Search .......................... 192/0.096, 0.098; 74/480 B, 480 R, 878

[56] References Cited

U.S. PATENT DOCUMENTS

| | | | |
|---|---|---|---|
| 2,422,596 | 6/1947 | Stevens | 192/0.098 |
| 3,692,157 | 9/1972 | Arnold et al. | 192/0.098 |
| 3,727,737 | 4/1973 | Phinney | 192/0.098 |

*Primary Examiner*—James F. Coan

*Attorney, Agent, or Firm*—Quarles & Brady

[57] ABSTRACT

A plurality of single lever control stands are provided at remote locations for controlling a pneumatically operated marine propulsion system. Control of the propulsion system is transferred between the several control stands by connecting each stand to a source of supply air under pressure. The control stands each include a throttle valve which will produce a set of three pressure signals. A valve located at each stand must be actuated by an operator at that location before the air supply will be activated for that station. Two of the signals select the ahead and astern direction of motion for the vessel and the third signal varies in proportion to the throttle lever position and controls engine speed. Banks of shuttle valves receive pairs of sets of these pressure signals and pass onto the control the signals at the higher pressure level. The system includes transfer valves at the main and secondary stations which cannot be overridden by stations of lower priority.

4 Claims, 3 Drawing Figures

MARINE PROPULSION CONTROL TRANSFER SYSTEM

BACKGROUND OF THE INVENTION

This invention relates to pneumatic controls for ship propulsion systems, and more specifically to an improved system for transferring control between several control stations.

A common form of marine propulsion system employs ahead and astern air actuated clutches for connecting the prime mover to a reversing reduction gear unit for each propeller. The air actuated clutches are engaged by inflation and the degree of clutch engagement can be controlled by controlling the amount of inflation. A pneumatic control system is normally provided for controlling the amount of inflation and this control system also typically provides control for an engine speed governor which determines the engine speed. A single throttle lever apparatus can be provided for controlling both the clutch engagement and engine speed by movement of the lever in an ahead or astern direction from neutral. An example of such a control for a ship's propulsion system is found in my earlier U.S. Pat. No. 3,727,737, issued Apr. 17, 1973, for "Pressure Modulating System for Reversing Clutches and Throttle Control".

It is common to provide more than one control station. Thus, both engine room and pilot house control stations are typically provided. With larger vessels, visibility from the pilot house may be limited in one or more directions so that it is desirable to locate additional control stations at sites offering a view of a specific area of the ship such as at a winch, the side of the ship, or at a higher position in the pilot house for a better forward view. The several control stations are typically duplicates of each other with each offering full control of the propulsion system.

Transfer systems are in use in marine controls which allow any of the several control stations to operate the vessel. This is normally accomplished by switching the supply of compressed air used in the control, and in clutch inflation, to a specific one of the control stations. Two versions of supply air transfer stations are presently in use. In one, the supply air is directed to the desired station which is then turned on prior to use by the operator. This system places the controls in neutral during each transfer and allows operation only by the specific control station which is selected. The difficulty with this approach is that it does not allow for the maintaining of tension on a towing cable or the maintaining of headway against the current while changing operating stations because the controls are placed in neutral in each transfer.

The second approach in use maintains the speed control signals during the transfer cycle and permits control by any station at any time. The disadvantage of this approach is that it permits transfer to an unattended operating station. If that unattended operating station has been left in some control mode other than neutral, it immediately becomes active and operates the vessel.

I have developed a system for transferring control between remote stations which requires an initial operation at a particular station in order to make that station active so that transfer cannot be made to an unattended station. At the same time, my transfer system maintains a control signal during the period of transfer from one station to another.

SUMMARY OF THE INVENTION

A transfer system in accordance with my invention includes first and at least two second control stations each including means actuable to provide a set of pressure signals for a pneumatic marine propulsion control, transfer means at the first station for alternatively connecting a source of air under pressure to the first station or the second stations, manually actuatable means at each second station to generate a pressure attendance signal, means responsive to the attendance signals for completing the connection of a selected one of said second stations to the source, and means for comparing the sets of pressure signals to pass to control the signals from the selected station.

Further, in accordance with my invention, the signal generating means at one of the second stations is manually actuatable to either provide an attendance signal or to activate the signal generating means at the other second station.

It is an object of my invention to provide a system for switching control of the ship's propulsion system between alternative control stations.

It is a further object of my invention to provide such a transfer system in which a control station must be attended before such control station is activated.

It is also an object of this invention to provide such a transfer system in which a pressure signal to the propulsion system can be maintained at all times during the transfer of the control from one station to another.

The foregoing and other objects of this invention will appear in the description which follows. In the following description reference is made to the accompanying drawings which illustrate a preferred embodiment of the invention.

DESCRIPTION OF THE PREFERRED EMBODIMENT

Figure 1:
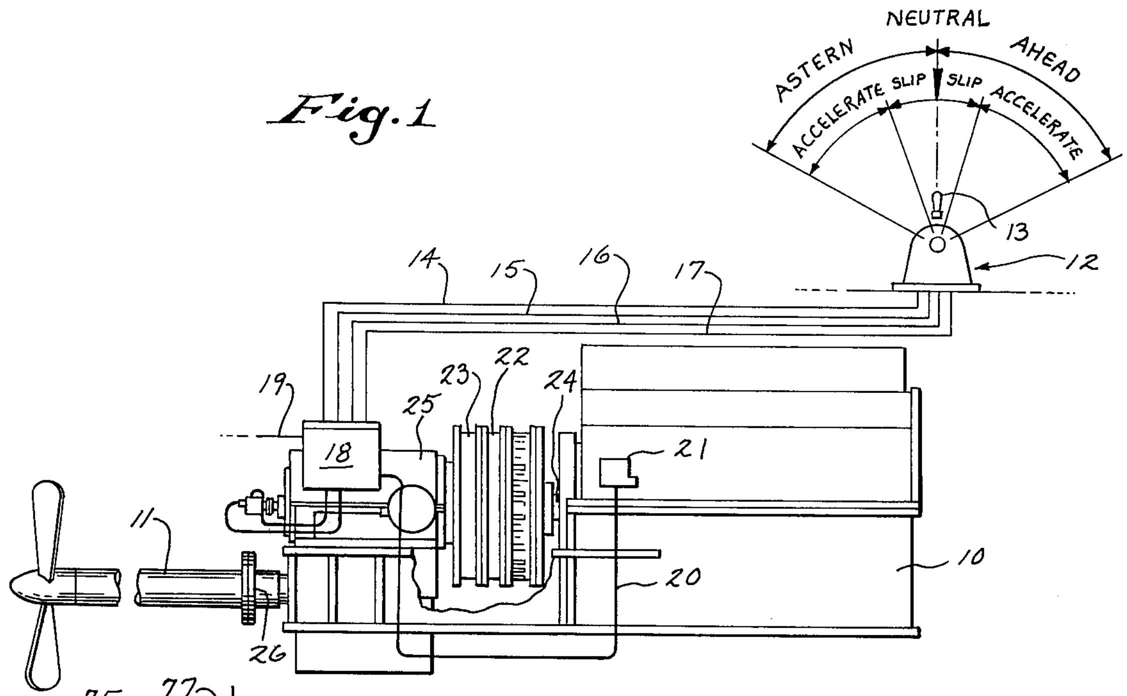
FIG. 1 is a schematic representation of a ship's propulsion system with which the improved control transfer system of the present invention may be employed.

FIG. 1 illustrates a typical arrangement of a pneumatically controlled marine propulsion system which controls the speed of the ship's engine 10 and its connection to the propeller shaft 11. The propulsion system responds to a control stand 12 which mounts a throttle lever 13. The control stand 12 illustrated in FIG. 1 is typical and may be located in the engine room or at any other location from which it may be desired to operate the vessel. The control stand is connectable to a supply air line 14 and can be connected to control lines 15, 16 and 17 which lead to a control panel assembly 18.

The control panel assembly 18 is connected to the ship's pressurized air source by a main supply line 19. The panel assembly 18, under control of a throttle lever of which the lever 13 is typical, will function to regulate the supply of air through a line 20 to a throttle speed governor 21 for the engine 10 and will also function to first select and then control the supply of air to an ahead clutch 22 and an astern clutch 23. The clutches 22 and 23 act to transmit torque from the engine 10, through a drive shaft 24, to the input of a reverse reduction gear train 25 whose output shaft 26 is connected to the propeller shaft 11. The engine 10 is typically unidirectional and has a high speed output which is low in torque. Accordingly, the reverse reduction gear train 25 reverses the direction of drive when required and also functions to reduce the rotational speed and to increase the torque.

In addition to the supply air line 14, three operating lines connect with the relay panel 18. A first operating line 15 will contain air pressure proportional to throttle lever position. That is, as the throttle lever is moved from its neutral position in either direction, the line 15 will be provided with air at a pressure which increases as the throttle lever moves further away from neutral. The other two operating lines 16 and 17 are piloting lines which control the selection of the astern and ahead clutches 23 and 22, respectively. Specifically, if the line 16 is provided with air under pressure, that is a signal for the selection of the astern clutch 23. The pilot lines 16 and 17 are controlled also by the movement of the throttle lever 13. In the typical system, the first five degrees of movement of a throttle lever in either direction away from neutral will result in the connection of the supply air to the respective one of the piloting air lines 16 or 17 to thereby actuate a four-way selector valve 31 for selection of the appropriate ahead or astern clutch 22 or 23. Thus, the throttle lever is movable forwardly or rearwardly from a neutral position to select the ship's direction of travel. The amount of movement of the throttle lever from neutral regulates the degree of clutch engagement and thereafter the engine speed.

The control panel assembly 18 is of known construction and is more fully disclosed and described in my co-pending patent application Ser. No. 715,680, filed Aug. 19, 1976, for "Marine Propulsion Control System." Reference should be had to that application for a full description. In general, the operating line 15, whose air pressure is proportional to lever position, leads to the pilot port of a relay valve 32 whose inlet port is connected to the supply air line 19 and whose outlet port is connected by a line 33 to the inlet port of a master control valve 34. The relay valve 32 will relay or repeat large quantities of supply air from the supply line to the line 33 at a pressure level which is the same as the air pressure in the piloting line 15. The relay valve 32 and its connections to the supply air line 19 and master control valve 34 constitute a first air branch.

The master control valve 34 has a second inlet port which is connected to a second air branch leading from the air supply line 19. The second branch includes a choke valve 35 and a boost valve 36 connected in parallel across the supply air line 19 and the second inlet port of the master control valve 34. An outlet port of the master control connects to a third air branch which is comprised of an operating line 37 connected to the inlet port of the clutch selector valve 31. The clutch selector valve 31 has a pair of outlet ports which are connected to respective ones of the ahead and astern clutches 22 and 23.

After the throttle lever has been moved 5° forwardly or rearwardly of its neutral position to cause the piloting of the clutch selector valve 31 to connect the selected one of its outlet ports to the operating line 37, air under pressure will pass through the master control valve 34 and the clutch selector valve 31 to begin to inflate selected clutch 22 or 23. During the inflation of one of the clutches, the other clutch will be deflated through its corresponding exhaust port. When the control lever is in neutral, both the clutches are exhausted to the atmosphere through the exhaust ports of the clutch selector valve 31.

The master control valve 34 is a pneumatic piloted, pressure sensitive valve that changes the air passages within itself when air at a first control pressure, or higher is applied to its pilot port. The pilot port for the master control valve 34 leads to the operating line 33 which is also connected to the first inlet of the master control valve 34. Thus, air at the same pressure level will be supplied to both the first inlet port and the pilot port, and this pressure is at the same level as that supplied to the relay valve 32 by the piloting line 15 and is representative of the position of the throttle lever. So long as the pressure supply through the operating line 33 is less than a first control pressure which is the piloting pressure for the master control valve 34, that pressure supply will be directed through the master control valve 34 to the operating line 37 and thence to the selected clutch 22 or 23.

When the throttle lever is moved to a position from neutral such that the first control pressure is exceeded, the master control valve 34 will disconnect the first air branch from the clutches and will instead connect the second air branch to the clutch being controlled. At first, the choke valve 35 will function to permit air to flow from the supply air line through the master control valve 34 and to the operating line 37 at a programmed rate that is determined by the size of the choke valve 35. As a result, the clutch is not abruptly fully inflated. There is no flow of air through the boost valve 36 at this time because it is normally closed and will not open until piloted by the air pressure within the clutch being inflated.

Such piloting of the boost valve 36 is accomplished by a shuttle valve 38 having a pair of opposing inlets connected by piloting lines 39 and 40 to the supply lines for the respective ahead and astern clutches 22 and 23. The shuttle valve 38 will connect either, but not both, of its inlet ports with its outlet port depending upon which of the clutches has been selected and is thus at the highest pressure. The output of the shuttle valve 38 is connected to a piloting line 41 connected to the pilot port of the boost valve 36. When the air pressure within the inflating clutch reaches a second control pressure at which the boost valve 36 is set to be piloted, that valve will open to connect the supply air line to the second port of the master control valve 34 thereby bypassing the choke valve 35. When this occurs, full supply air pressure is supplied to the operating line 37 and through the clutch selector valve 31 so that the selected clutch will be fully inflated.

The control panel assembly 18 controls the throttle speed governor 21 by means of a double piloted throttle governor valve 42. The throttle governor valve 42 has an inlet connected by a line 43 to the line 33 leaving the outlet of the relay valve 32. An outlet port of the throttle governor valve 42 is connected to the operating line 20 for the throttle speed governor 21. A pilot line 44 extends from the outlet of the shuttle valve 38 to one pilot port for the governor valve 42.

As soon as the pressure within the selected clutch rises to the level of the piloting pressure of the governor valve 42, the governor valve will open to connect the outlet of the relay valve 32 to the operating line 20, for the throttle speed governor 21. When this occurs, the output of the relay valve 32, which is air pressure proportional to the throttle lever position, will be fed to the throttle speed governor 21 to control the speed of the engine beyond idle. Increasing movement of the throttle lever away from neutral will proportionately increase the air pressure signal to the throttle speed governor to increase the speed. In the particular arrangement illustrated in FIG. 2, the speed signal pressure in the operating line 20 is fed back to a second pilot port of the governor valve 42 where it, together with a spring bias within the valve 42, opposes the clutch inflation signal. Therefore, if supply air pressure should fall for any reason and the clutches begin to deflate, the engine will not continue at its speed setting but will be reduced in speed whenever the speed signal pressure plus the biasing force is less than the air pressure within the selected clutch.

The marine propulsion control system has been described thus far in relation to a single control station and a single throttle lever. The present invention is directed to the transfer of control between multiple control stations each of which has its own throttle lever for controlling direction and speed.

Specifically, a first control stand 12 is located at the engine room station. A second control stand 50 is located at a pilot house station, and remote control stands 51 and 52 may be located at various stations on the vessel, such as on the aft deck and on the upper pilot house. Each of the control stands 12, 50, 51 and 52 includes identical pressure and directional flow control throttle valves 53*a*, *b*, *c* and *d*, respectively. The throttle valves 53 are of known construction and are operative to furnish full supply air pressure from a supply line 54*a*, *b*, *c* and *d*, respectively to one or the other of piloting air lines 55*a*, *b*, *c* and *d* or 56*a*, *b*, *c* and *d*. As will be described further hereafter, the piloting lines 55 are adapated to pilot the clutch selector valve 31 to select the astern clutch 23 and the piloting lines 56 are adapted to pilot the clutch selector valve 31 to select the ahead clutch 22. The throttle valves 53 also each supply graduated pressure to an operating line 57*a*, *b*, *c* and *d*, respectively, which graduated pressure is always proportional to the degree of movement of the respective throttle lever away from neutral.

The operating lines 55*c*, 56*c* and 57*c* of the aft deck station together with the similar operating lines 55*b*, 56*b* and 57*b* of the pilot house station feed into a first bank of shuttle valves 58, 59 and 60. The shuttle valves are of known construction and include a rubber diaphragm which will seal against one or the other of the inlets to connect the opposite inlet to the outlet. When a pressure differential exists at either inlet port, the higher pressure at that inlet port forces the diaphragm to seal against the opposite side of the valve and the higher pressure flows out the common outlet. Thus, the shuttle valve automatically selects and directs the flow of air from one or the other of the two operating lines to a common outlet. It functions to connect two independent lines to a common line without destroying the segregation of the lines.

The outlets of each of the first bank of shuttle valves 58, 59 and 60 connect to lines 61, 62 and 63, respectively, and these lines are one of the independent input lines to a second bank of shuttle valves 64, 65 and 66. The operating lines 55*d*, 56*d* and 57*d* constitute the second independent lines to each of the second bank of shuttle valves 64, 65 and 66. The outlets of the second bank of shuttle valves connect to lines 67, 68 and 69, respectively, which in turn constitute one of the two independent input lines to each of a third bank of shuttle valves 70, 71 and 72, respectively. The other inputs to the third bank of shuttle valves 70, 71 and 72 are the operating lines 55*a*, 56*a* and 57*a* of the throttle valve 53*a* of the engine room station. The outlets of the third bank of shuttle valves connect to the operating lines 15, 16 and 17 which lead to the panel assembly 18.

The three banks of shuttle valves function to pass control of the panel assembly 18 to the station which has been activated and is producing the pressure signals. All stations other than the selected station will, as will appear hereafter, have their signals vented so that only the selected station will be producing pressure signals. Thus, if the engine room station is being operated, the third bank of shuttle valves will place that station in control of the operating lines 15, 16 and 17. If, on the other hand, one of the other stations has been activated and is producing the pressure signals, the third bank of shuttle valves 70, 71 and 72 will place such other station in control of the operating lines 15, 16 and 17. As between the upper pilot house on the one hand and the pilot house or aft deck station on the other hand, the second bank of shuttle valves 64, 65 and 66 will place the activated station in control of the operating lines 15, 16 and 17. Similarly, as between the pilot house and the aft deck, the first bank of shuttle valves 58, 59 and 60 will place the actuated one in control of the operating lines 15, 16 and 17.

In the case of the shuttle valves in the several banks which are used to compare ahead and astern piloting lines 55 and 56, the shuttle valve will recognize and react to the difference between a positive pressure signal indicating the selection of a particular clutch and the absence of a signal indicating that the particular control stand is in neutral or that the signal from the control stand has been vented because another stand has been selected. In the case of the shuttle valves in the several banks which are used to compare the speed pressure signals in the lines 57, the shuttle valve will react to the higher pressure signal calling for the higher engine speed.

Figure 2:
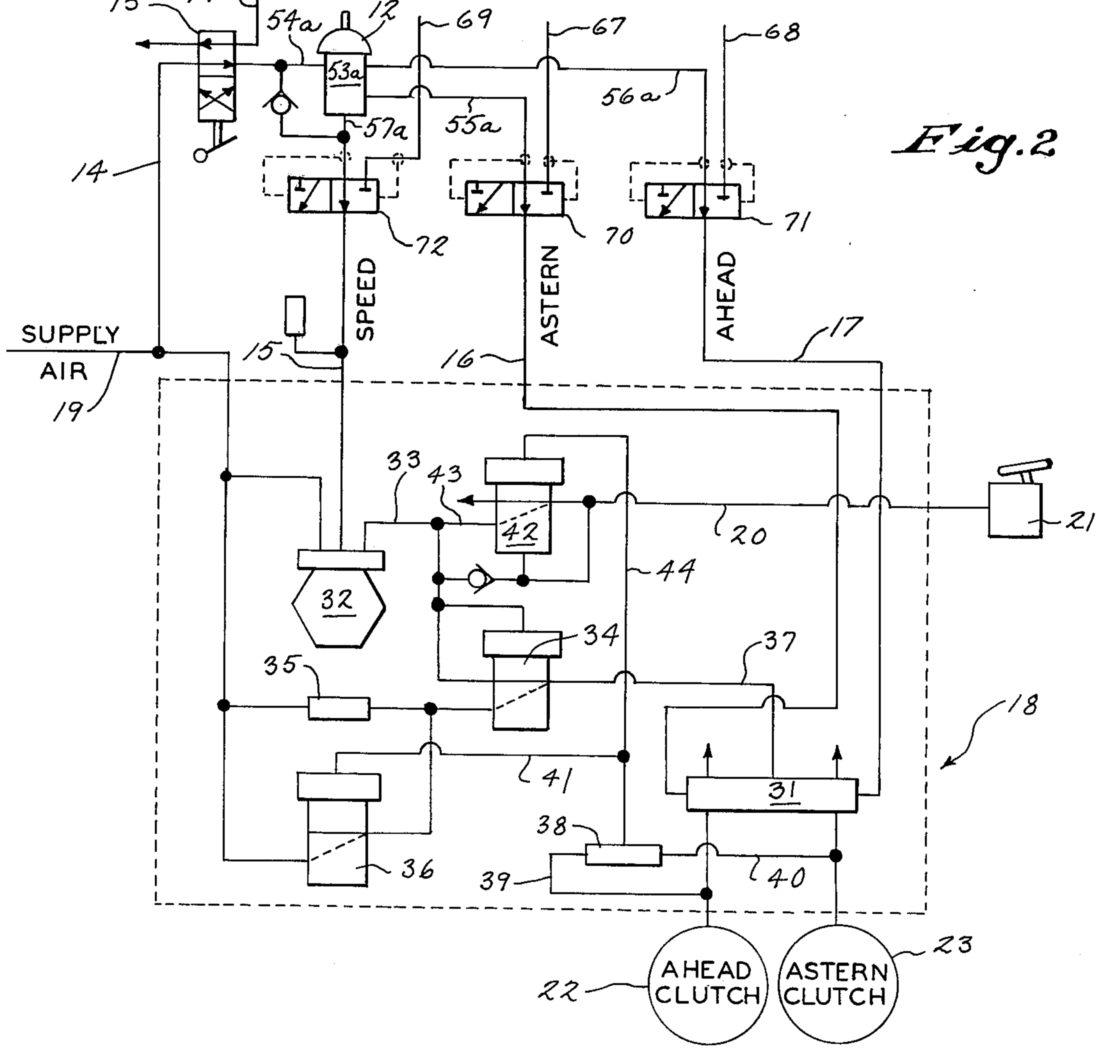
FIG. 2 is a schematic representation of a pneumatic control system for the ship's propulsion system and including the engine room control station.

Supply air reaches the throttle valve 53*a* of the engine room station through a transfer valve 75 located at the engine room station. The transfer valve 75 is of known construction and is a four-way, two-position valve which is manually movable between its two positions by a lever. In the position as shown in FIG. 2, the transfer valve 75 connects the input line 54*a* for the engine room throttle valve 53*a* to the line 14 leading from the supply air line 19. In its alternate position it connects the supply air line 14 to a supply line 77 leading to the pilot house station. In either position of the transfer valve 75, the supply line to the unused control station is connected to exhaust. Thus, in the arrangement shown, the transfer valve can be manually actuated either to assume control at the engine room or to allow control to be passed on to another station.

The line 77 leading from the engine room transfer valve 75 to the pilot house station connects to the inlet of an attendance valve 78. The attendance valve is a three-way, two-position valve whose outlet port is connected to a line 79. The attendance valve 78 is spring biased to a position in which the line 79 is connected to exhaust and is manually movable to an alternate position in which the line 79 is connected to the supply line 77. The attendance valve 78 has the further feature of providing a pilot hold for the alternate actuated position whenever there is pressure in the outlet line 79 sufficient to overcome the spring force. Thus, the attendance valve 78 normally blocks the supply air and functions to connect supply air to the line 79 upon being actuated and to maintain such connection so long as pressure is supplied through the supply line 77 to the outlet line 79. If the supply line 77 is connected to exhaust by manipulation of the transfer valve 75 at the engine room, the attendance valve 78 will return under the urgings of the spring to its normal position in which the outlet line 79 is connected to exhaust. Accordingly, even though the transfer valve 75 in the engine room is set by an operator to supply air under pressure to the pilot house so that control of the vessel may be accomplished at the pilot house, until and unless an operator in the pilot house manually actuates the attendance valve 78, air pressure will not be available in the pilot house to control the vessel. This insures that an operator will be in attendance at the pilot house before control of the vessel is switched to the pilot house.

The outlet line 79 of the attendance valve 78 at the pilot house is connected to the inlet of a pilot house transfer valve 80. The pilot house transfer valve 80 is a two-position, four-way valve which is provided with a detent to maintain the valve in the last position in which it has been placed. The transfer valve 80 is movable to connect supply air from the attendance valve outlet line 79 to either of its outlet ports while simultaneously connecting the unused outlet port to a vent.

One of the outlet ports 81 of the transfer valve 80 is connected by a line 82 to an additional line 83 which leads to the input of an attendance valve 84 provided in the aft deck station, and also leads to a line 85 connected to the input of an identical attendance valve 86 located in the upper pilot house. The attendance valves 84 and 86 are similar to the attendance valve 78 at the pilot house except that they do not have the pilot cylinder hold feature. As a result, both the attendance valves 84 and 86 located at the remote stations on the aft deck and upper pilot house can be actuated to an alternate position in which their outlet lines 87 and 88, respectively, are connected to the air supply through the lines 83 and 85 only so long as the valve is manually held in an actuated position. Since both of these attendance valves provide only a piloting signal in a manner to be described hereafter, they function similar to a push button with a spring return and will provide a short signal to pilot a two-position, four-way selector valve 89.

The second outlet port 90 of the transfer valve 80 is connected to a pilot line 91 which provides one of the two pilot signals to another two-position, four-way selector valve 92. The second piloting signal to the second four-way valve 92 is provided by the output of a shuttle valve 93 whose independent inputs are the signals in the two pilot lines 87 and 88 which lead from the attendance valves 84 and 86 at the remote stations. The inlet port of the second selector valve 92 is connected to the supply air line 77 by a line 93.

The two selector valves 89 and 92 operate to transfer the supply air pressure to the desired one of the pilot house or remote stations. Thus, if the attendance valve 78 at the pilot house has been actuated by an operator so that supply air can be provided to the line 79, and if the transfer valve 80 is in the position to pass supply air to the port 90, a high pressure signal will be provided to the pilot line 91 to thereby actuate the selector valve 92 to shift it to a position in which the supply air through the lines 77 and 93 is connected to the supply inlet line **54*b* for the pilot house control stand. Supply air is thus provided to the pilot house stand 50 so that station can function to control the vessel. Only a momentary signal is needed to accomplish the transfer of the control to the pilot house station and once the selector valve 92 has been shifted it will not move to its alternate position until a piloting signal is provided at its other pilot port. However, the detent provided in the transfer valve 90** will hold the connection, thereby preventing the pilot house control signals from being overriden.

Figure 3:
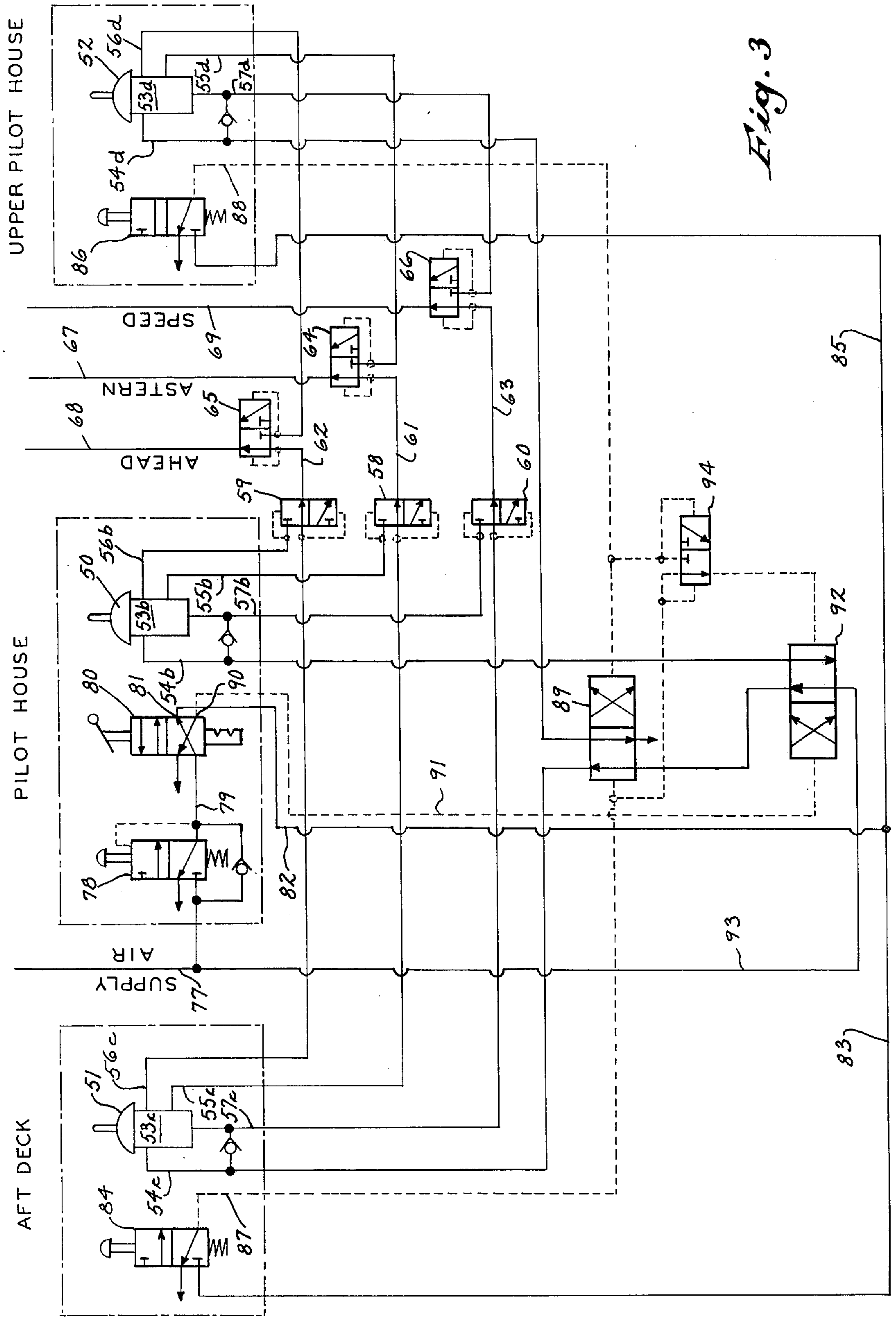
FIG. 3 is a schematic representation of the pilot house station and other remote stations and the transfer control therebetween.

Assume now that the transfer valve 80 is manually placed in the position illustrated in FIG. 3 in which the supply air is connected to the attendance valves 84 and 86. If now the attendance valve 84 at the aft deck is actuated indicating that an operator is present at that location and desires to obtain control of the vessel, a piloting signal will result in the line 87 which will shift a shuttle valve 94 to a position where that piloting signal can be applied to the selector valve 92 to shift that valve. This will now connect the supply air to the inlet of the first selector valve 89. Since that same piloting pulse is provided by the line 87 to one of the pilot ports of such selector valve 89, that valve will be placed in a position in which the inlet line **54*c* of the aft deck throttle valve 53*c* is connected to the air supply. Thus, the aft deck stand is now placed in a condition in which it can control the vessel. At the same time that supply air is transferred to the aft deck station, the second selector valve will exhaust the supply to the pilot house throttle valve 53*b* and the output signals from the pilot house throttle valve 53*b* will also be vented. This will cause the first bank of shuttle valves 58, 59 and 60** to shift.

The upper pilot house stand can assume control by the momentary actuation of the attendance valve 86 at that station which will produce a pilot signal to shift the selector valve 89 and direct a supply of air to the throttle valve **53*d*** at the upper pilot house station.

It will be seen from the foregoing description that in the preferred embodiment the engine room station is always capable of assuming control of the vessel. The pilot house and remote stations can be activated from the engine room station and if an attendance valve is actuated at the site, they can obtain control. However, the pilot house by means of the transfer valve 80 can always obtain control from either the aft deck or upper pilot house remote locations. Accordingly, in the preferred embodiment the engine room contains the master control station, the pilot house contains a secondary control station, and the other remote stations are tertiary control stations subservient to both the master control station and the secondary control stations.

A transfer system in accordance with this invention may be adapted for any number of possible control stations. For example, a three control station arrangement could be employed in which only one of the remote stations is used in connection with an engine room station and a pilot house station. In that event, a single selector valve would be needed which is piloted by manually actuated valves at the pilot house and the one remote station, and only two banks of shuttle valves would be needed. Additional remote stations can be added to the system by adding suitable selector valves and banks of shuttle valves.

It will be seen from the above description that a control system in accordance with this invention requires that a valve at a control station be manually actuated by an operator before that control station can be activated.

If the new selected station has its throttle valve preset to its desired operating position, the control signals are established before the previous signals are vented so that a control pressure is maintained at all times on the control even during transfer of control from one station to another.

I claim:

1. A control transfer system for a pneumatic marine propulsion control supplied by a source of air under pressure and responsive to pressure signals including a pair of alternative pressure signals indicative of the desired direction of travel and a third pressure signal whose magnitude is proportional to the desired engine speed, comprising:

a master control station including a manually actuatable throttle valve connected to said source and adapted to provide a first set of said pressure signals;

a secondary control station remote from said master station and including a manually actuatable throttle valve capable of providing a second set of said pressure signals after connection to said source;

a transfer valve at said master station for connecting said source to said secondary station;

a tertiary control station remote from said master station and said secondary station, said tertiary station including a manually actuatable throttle valve capable of providing a third set of said pressure signals after connection to said source;

a pilot operated selector valve connected to receive air under pressure from said source and to alternatively connect such air under pressure to the throttle valves of said secondary and tertiary stations;

a manually actuatable attendance valve at said tertiary station adapted when actuated to pilot said selector valve to connect air under pressure from said source to said tertiary station throttle valve;

manually actuatable transfer and attendance valves at said secondary station, said secondary station attendance valve adapted when actuated to connect said source to said secondary station transfer valve, said secondary station transfer valve being adapted to pilot said selector valve to connect air under pressure to said secondary station throttle valve and alternatively to connect said source to said tertiary station attendance valve;

a first bank of shuttle valves each connected to receive one of said pressure signals of said first set and a corresponding one of said pressure signals of another set and to connect to said control the respective signals which are at the higher pressure; and a second bank of shuttle valves each connected to receive one of said pressure signals of said second set and a corresponding one of said pressure signals of said third set and to connect to said first bank of shuttle valves the respective signals which are at the higher pressure.

2. A control transfer system for a pneumatic marine propulsion control responsive to pressure signals to selectively engage ahead and astern clutches and to control engine speed, comprising a first control station including first valve means actuatable to provide a first set of pressure signals, after connection to said air source;

a remote control circuit including second and third remote control stations having respective second and third valve means each actuatable to provide a set of pressure signals after connection to said air source;

transfer valve means at said first station for connecting said air source to said first station or said remote control circuit;

pilot operated selector valve means adapted to alternately connect air under pressure from said source to said second or third valve means;

manually actuatable signal valve means at each of said remote control stations and adapted when actuated to pilot said selector valve means;

said signal valve means at said second station being manually actuatable to connect air under pressure from said source to pilot said selector valve means and to alternatively connect said air source to said signal valve means at said third station;

manually actuatable attendance valve means at said second station adapted when actuated to complete the connection of said air source to said signal valve means; and comparator means receiving said sets of pressure signals and adapted to pass on to said control the set of signals from the selected control station.

3. A control transfer system in accordance with claim 2, wherein said comparator means comprises first shuttle valves each connected to receive the corresponding signals of the sets of signals from said second and third stations and to output the set of signals at the higher pressure and second shuttle valves each connected to receive the corresponding signals of said first set and the output of said first shuttle valves and to pass on to said control the set at the higher pressure.

4. A control transfer system for a pneumatic marine propulsion control supplied by a source of air under pressure and responsive to pressure signals including a pair of alternative pressure signals indicative of the desired direction of travel and a third pressure signal whose magnitude is proportional to the desired engine speed, comprising:

a master control station including a manually actuatable throttle valve connected to said source and adapted to provide a first set of said pressure signals;

a secondary control station remote from said master station and including a manually actuatable throttle valve capable of providing a second set of said pressure signals after connection to said source;

a transfer valve at said master station for connecting said source to said secondary station;

a pair of tertiary control stations remote from said master station and said secondary station, each of said tertiary stations including a manually actuatable throttle valve capable of providing a set of said pressure signals after connection to said source;

first and second pilot operated selector valves; said first selector valve connected to receive air under pressure from said source and to alternatively connect such air under pressure to the throttle valve of said secondary station and said second selector valve alternatively connecting air under pressure from said first selector valve to one or the other of said tertiary station throttle valves;

a manually actuatable attendance valve at each of said tertiary stations and adapted when actuated to pilot said first and second selector valves;

manually actuatable transfer and attendance valves at said secondary station, said secondary station attendance valve adapted when actuated to connect said source to said secondary station transfer valve, said secondary station transfer valve being adapted to pilot said first selector valve to connect air under pressure to said secondary station throttle valve and to prevent pilot signals from said tertiary station attendance valve from affecting said first selector valve, said secondary station transfer valve being alternatively adapted to connect said source to said tertiary station attendance valves;

a first bank of shuttle valves each connected to receiving one of the pressure signals of a set from one of said tertiary stations and the corresponding one of the pressure signals of said second set to pass on the signals at the higher pressure;

a second bank of shuttle valves each connected to receiving one of the pressure signals from said first bank and the corresponding one of the pressure signals from the other tertiary station and to pass on the signals at the higher pressures; and a third bank of shuttle valves each connected to receive one of the pressure signals from said second bank and the corresponding one of the pressure signals of said first set to connect the signals at the higher pressure to said control.

* * * * *